(12) United States Patent
Spottswood

(10) Patent No.: US 7,350,067 B2
(45) Date of Patent: Mar. 25, 2008

(54) BIOS SECURITY MANAGEMENT

(75) Inventor: Jason Spottswood, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 363 days.

(21) Appl. No.: 11/158,826

(22) Filed: Jun. 22, 2005

(65) Prior Publication Data

US 2006/0294349 A1 Dec. 28, 2006

(51) Int. Cl.
H04L 9/00 (2006.01)

(52) U.S. Cl. .................... 713/1; 713/2; 726/4; 726/34
(58) Field of Classification Search .................... 713/1, 713/2, 200, 202; 726/20, 34
See application file for complete search history.

(56) References Cited

U.S. PATENT DOCUMENTS

| | | | |
|---|---|---|---|
| 5,805,882 A | 9/1998 | Cooper et al. | |
| 6,073,206 A | 6/2000 | Piwonka | |
| 6,223,284 B1 | 4/2001 | Novoa | |
| 6,301,665 B1 | 10/2001 | Simonich | |
| 6,363,492 B1 | 3/2002 | James, Jr. et al. | |
| 6,397,337 B1 | 5/2002 | Garrett | |
| 6,463,537 B1 | 10/2002 | Tello | |
| 6,484,262 B1 | 11/2002 | Herzi | |
| 6,658,562 B1 | 12/2003 | Bonomo | |
| 6,725,382 B1 | 4/2004 | Thomson | |
| 6,823,464 B2 | 11/2004 | Cromer | |
| 6,832,320 B1 | 12/2004 | Broyles | |
| 6,889,340 B1 | 5/2005 | Bramley | |
| 7,000,249 B2 * | 2/2006 | Lee .............................. | 726/20 |
| 2001/0032319 A1 | 10/2001 | Setlak | |
| 2002/0120845 A1 | 8/2002 | Cromer | |
| 2002/0174342 A1 | 11/2002 | Freeman | |
| 2002/0174353 A1 | 11/2002 | Lee | |
| 2003/0041260 A1 | 2/2003 | Yoneyama | |
| 2003/0084316 A1 | 5/2003 | Schwartz | |
| 2004/0111633 A1 | 6/2004 | Chang | |
| 2005/0010810 A1 | 1/2005 | Broyles | |
| 2005/0044404 A1 | 2/2005 | Bhansali | |

* cited by examiner

Primary Examiner—Abdelmoniem Elamin

(57) ABSTRACT

In one embodiment a computer system, comprises a processor, a basic input/output system (BIOS) including logic instructions which, when executed by the processor, configure the processor to initiate power on self test (POST) processing in the basic input/output system (BIOS) of a computing device, detect a connection to a remote memory device, and write an access level indicator stored on the remote memory device to an output device.

19 Claims, 3 Drawing Sheets

BIOS SECURITY MANAGEMENT

TECHNICAL FIELD

This application relates to electronic computing, and more particularly to BIOS security management.

BACKGROUND

Security remains important issue for computer systems. Password protection may be used to protect computer systems from unauthorized users. Additionally, computing systems may implement multiple levels of security access, each of which allows the user to different rights to install, use, and/or modify computing resources.

System administrators in large computing environments may administer hundreds or even thousands of computing devices. Adroit management of security access functions facilitates efficient operations.

SUMMARY

In one embodiment a computer system, comprises a processor, a basic input/output system (BIOS) including logic instructions which, when executed by the processor, configure the processor to initiate power on self test (POST) processing in the basic input/output system (BIOS) of a computing device, detect a connection to a remote memory device, and write an access level indicator stored on the remote memory device to an output device.

DETAILED DESCRIPTION

Described herein are exemplary system and methods for BIOS security management in a computing system. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
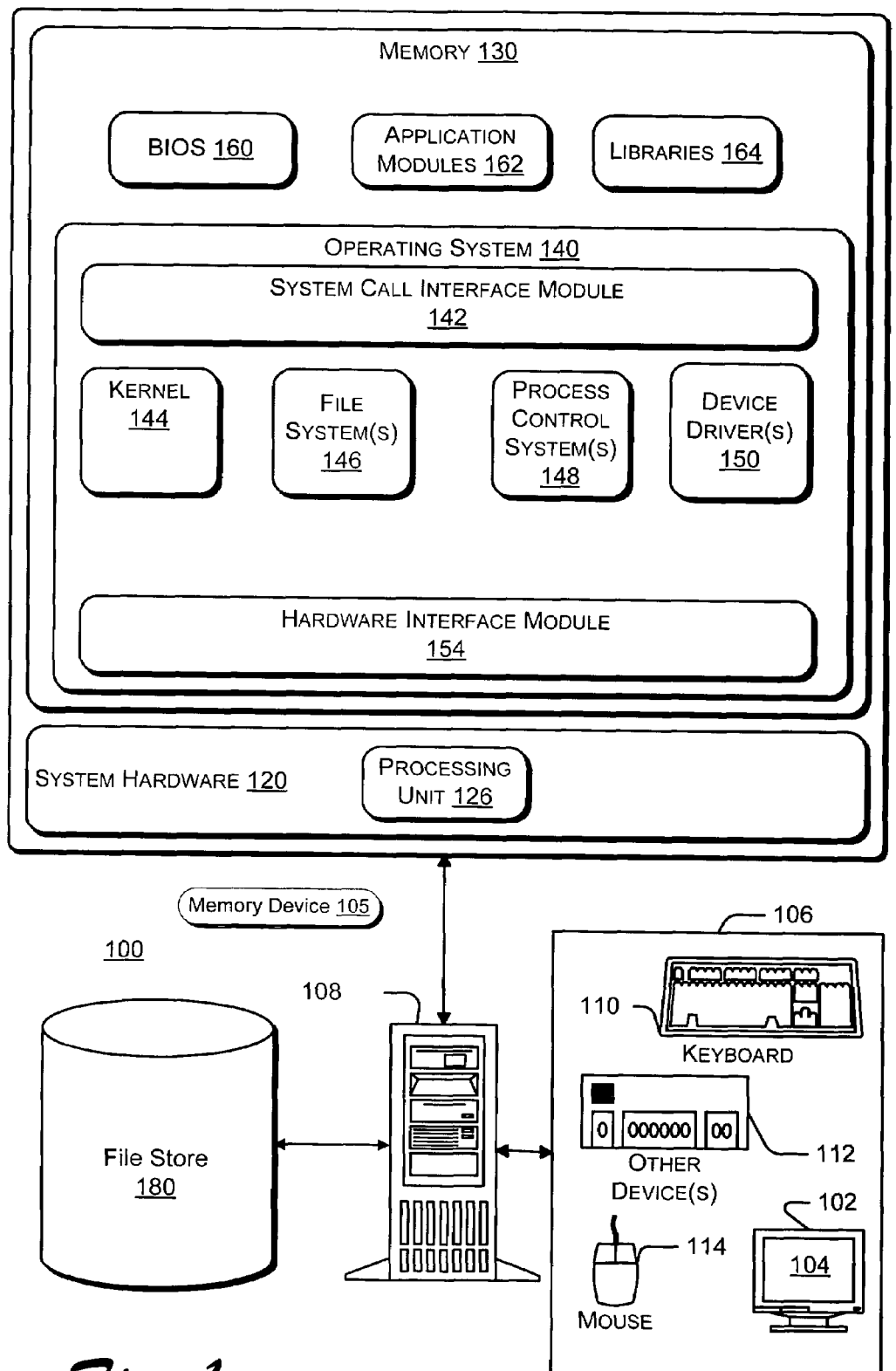
FIG. 1 is a schematic illustration of one embodiment of a BIOS security management system.

FIG. 1 is a schematic illustration of an exemplary computing system 100 adapted to include BIOS security management. In the illustrated embodiment, system 100 may be embodied as a hand-held or stationary device for accessing the Internet, a desktop PCs, notebook computer, personal digital assistant, or any other processing devices that have a basic input/output system (BIOS) or equivalent.

The computing system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 including a processing unit 126 and random access memory and/or read-only memory 130. A file store 180 is communicatively connected to computer 108. File store 180 may be internal such as, e.g., one or more hard drives, or external such as, e.g., one or more external hard drives, network attached storage, or a separate storage network.

Memory 130 includes an operating system 140 for managing operations of computer 108. In one embodiment, operating system 140 includes a hardware interface module 154 that provides an interface to system hardware 120. In addition, operating system 140 includes a kernel 144, one or more file systems 146 that manage files used in the operation of computer 108 and a process control subsystem 148 that manages processes executing on computer 108. Operating system 140 further includes one or more device drivers 150 and a system call interface module 142 that provides an interface between the operating system 140 and one or more application modules 162 and/or libraries 164. The various device drivers 150 interface with and generally control the hardware installed in the computing system 100.

In operation, one or more application modules 162 and/or libraries 164 executing on computer 108 make calls to the system call interface module 142 to execute one or more commands on the computer's processor. The system call interface module 142 invokes the services of the file systems 146 to manage the files required by the command(s) and the process control subsystem 148 to manage the process required by the command(s). The file system(s) 146 and the process control subsystem 148, in turn, invoke the services of the hardware interface module 154 to interface with the system hardware 120. The operating system kernel 144 can be generally considered as one or more software modules that are responsible for performing many operating system functions.

The particular embodiment of operating system 140 is not critical to the subject matter described herein. Operating system 140 may be embodied as a UNIX operating system or any derivative thereof (e.g., Linux, Solaris, etc.) or as a Windows® brand operating system.

Computing system 100 further includes a basic input/output system (BIOS) 160. In one embodiment, BIOS 160 may be implemented in flash memory and may comprise a power-on self-test (POST) module for performing system initialization and tests. In operation, when activation of computing system 100 begins processing unit 126 accesses BIOS 160 and shadows the instructions of BIOS 160, such as power-on self-test module, into operating memory. Processor 160 then executes power-on self-test operations to implement POST processing.

Figure 2:
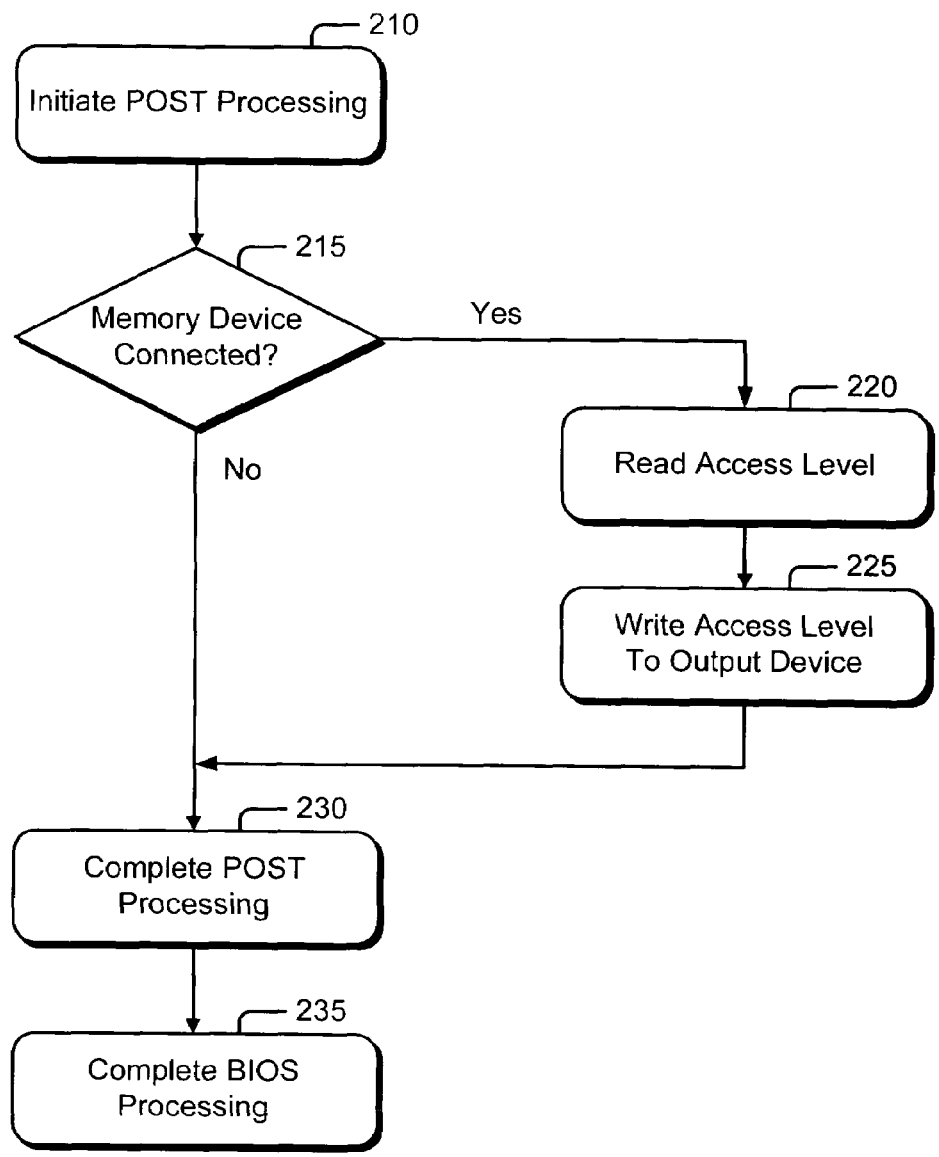
FIG. 2 is a flowchart illustrating operations in one embodiment of implementing BIOS security management.

FIG. 2 is a flowchart illustrating operations in one embodiment of implementing BIOS security management. In one embodiment the operations of FIG. 2 may be implemented by the BIOS 160, alone or in combination with other components of the operating system, when the computing system 100 is booted.

Referring to FIG. 2, at operation 210, BIOS 160 initiates power on self test (POST) processing. At operation 215 it is determined whether a remote memory device 105 is coupled to the computing system 100. In one embodiment the remote memory device 105 may be implemented as a universal serial bus (USB) memory device, a smartcard, a floppy disk or another suitable memory device. When the memory device 105 is connected, system hardware 120 may generate an interrupt, which may be detected by BIOS 160. Alternately, BIOS 160 may poll system hardware such as e.g., one or more I/O ports, to determine whether a memory device 105 is connected to the computing device.

If, at operation 215, a memory device 105 is connected to the computing system 100, then control passes to operation 220 and the BIOS decodes, if necessary, and reads an access level from the memory device. BIOS 160 may implement a suitable handshake protocol to facilitate establishing a communication session with the memory device. In one embodiment, the memory device 105 may include one or more indicia of access levels for the computing device. For example, a "user" access level may grant user rights to the computing device, or to specific software on the computing system 100. By contrast, an "administrator" access level may grant rights to install, remove, and use software on the computing device, and to view configuration files, registers, or other files that may be necessary to manage the computing system 100. Similarly, a "network administrator" access level may grant one or more privileges associated with the "administrator" access level and additional rights to perform networking functions such as, e.g., establishing a connection between the computing station and another computing system 100. Other suitable access levels may be implemented.

At operation 225 the BIOS 160 writes the access level to an output device. In one embodiment BIOS 160 writes the access level to a display associated with the computing system 100. This provides the user of the memory device 105 with an immediate indication of the access level provided by the memory device. In alternate embodiments, BIOS 160 writes the access level to one or more other output devices such as, e.g., a printer. In addition, BIOS 160 may record in a suitable memory location an identifier associate with the memory device 105 and the access right(s) granted by the memory device. This information may be transmitted to another computing system such as, e.g., a server, when the computing device is operational.

BIOS 160 may optionally implement additional security and/or authentication operations contemporaneous with displaying the access level information. In one embodiment, BIOS 160 may require the user associated with the memory device 105 to input an access code or another verification signal which may be used to authenticate the user. If the user is authenticated, then the user may be granted access to the computing system 100 with the rights associated with the access level encoded on the memory device.

At operation 230 POST processing is completed, and at operation 235, any remaining BIOS processing operations are completed. Operating control of the computing system 100 may then be assumed by the operating system 140.

Figure 3:
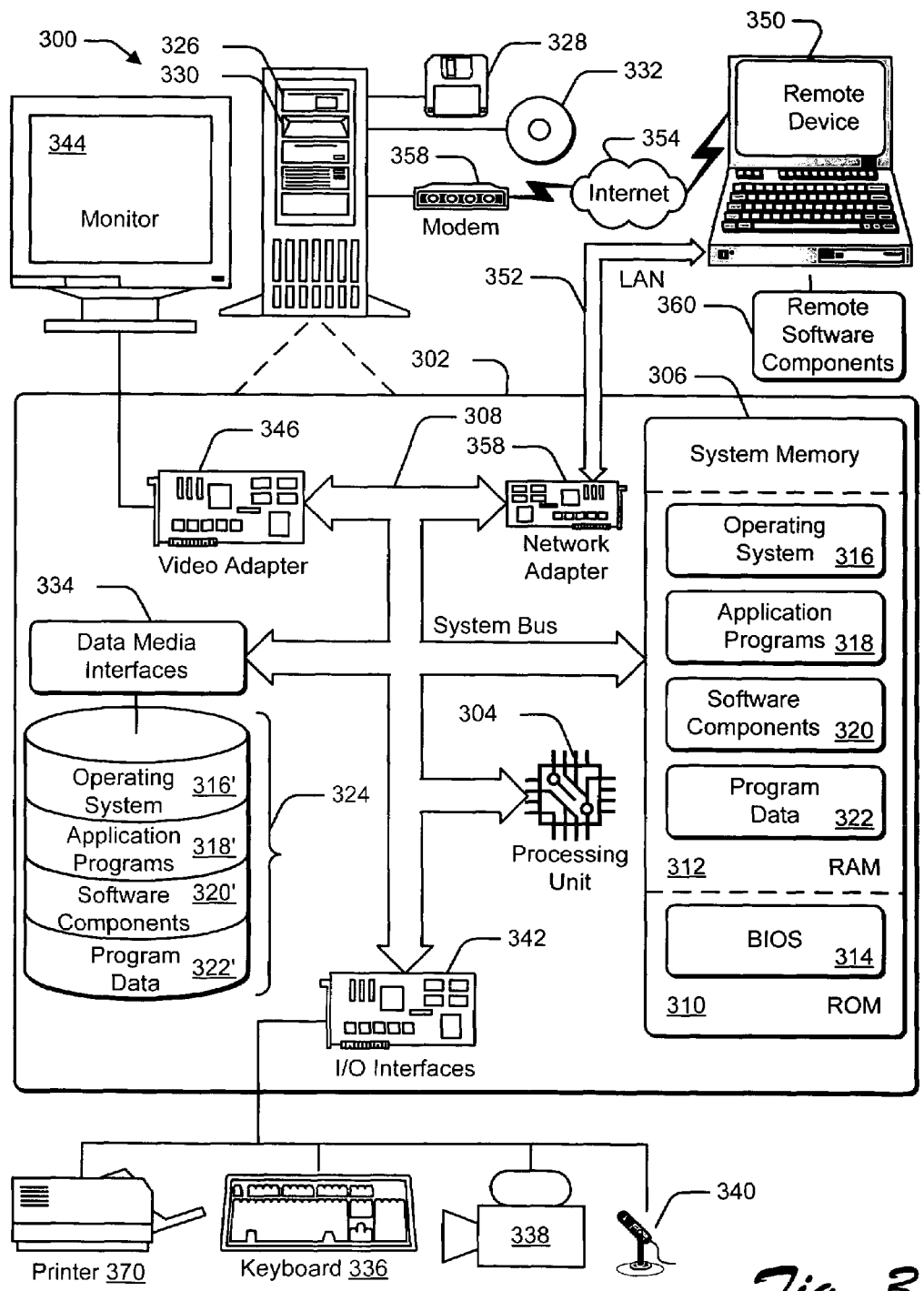
FIG. 3 is a schematic illustration of one embodiment of a computing environment.

FIG. 3 is a schematic illustration of one embodiment of a computing environment. The components shown in FIG. 3 are only examples, and are not intended to suggest any limitation as to the scope of the functionality of the invention; the invention is not necessarily dependent on the features shown in FIG. 3.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 3, the components of computer 300 may include, but are not limited to, a processing unit 304, a system memory 306, and a system bus 308 that couples various system components including the system memory 306 to the processing unit 304. The system bus 308 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus, and PCI Express (PCIE).

Computer 300 typically includes a variety of computer-readable media. Computer-readable media can be any available media that can be accessed by computer 300 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 300. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 306 includes computer storage media in the form of volatile and/or nonvolatile memory such as read only memory (ROM) 310 and random access memory (RAM) 312. A basic input/output system 314 (BIOS), containing the basic routines that help to transfer information between elements within computer 300, such as during start-up, is typically stored in ROM 310. RAM 312 typically contains data and/or program modules that are immediately accessible to and/or presently being operated on by processing unit 304. By way of example, and not limitation, FIG. 3 illustrates operating system 316, application programs 318, other software components 320, and program data 322.

The computer 300 may also include other removable/non-removable, volatile/nonvolatile computer storage media. By way of example only, the computer system of FIG. 3 may include a hard disk drive 324 that reads from or writes to non-removable, nonvolatile magnetic media, a magnetic disk drive 326 that reads from or writes to a removable, nonvolatile magnetic disk 328, and an optical disk drive 330 that reads from or writes to a removable, nonvolatile optical disk 332 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 324 is typically connected to the system bus 308 through a non-removable memory interface such as data media interface 334, and magnetic disk drive 326 and optical disk drive 330 are typically connected to the system bus 308 by a removable memory interface.

The drives and their associated computer storage media discussed above and illustrated in FIG. 3 provide storage of computer-readable instructions, data structures, program modules, and other data for computer 300. In FIG. 3, for example, hard disk drive 324 is illustrated as storing operating system 316', application programs 318', software components 320', and program data 322'. Note that these components can either be the same as or different from operating system 316, application programs 318, software components 320, and program data 322. Operating system 316, application programs 318, other program modules 320, and program data 322 are given different numbers here to illustrate that, at a minimum, they are different copies. A user may enter commands and information into the computer 300 through input devices such as a keyboard 336 and pointing device 338, commonly referred to as a mouse, trackball, or touch pad. Other input devices (not shown) may include a microphone 340, joystick, game pad, satellite dish, scanner, or the like. These and other input devices are often connected to the processing unit 304 through an input/output (I/O) interface 342 that is coupled to the system bus, but may be connected by other interface and bus structures, such as a parallel port, game port, or a universal serial bus (USB). A monitor 344 or other type of display device is also connected to the system bus 306 via an interface, such as a video adapter 346. In addition to the monitor 344, computers may also include other peripheral output devices (e.g., speakers) and one or more printers 370, which may be connected through the I/O interface 342.

The computer may operate in a networked environment using logical connections to one or more remote computers, such as a remote computing device 350. The remote computing device 350 may be a personal computer, a server, a router, a network PC, a peer device or other common network node, and typically includes many or all of the elements described above relative to computer 300. The logical connections depicted in FIG. 3 include a local area network (LAN) 352 and a wide area network (WAN) 354. Although the WAN 354 shown in FIG. 3 is the Internet, the WAN 354 may also include other networks. Such networking environments are commonplace in offices, enterprise-wide computer networks, intranets, and the like.

When used in a LAN networking environment, the computer 300 is connected to the LAN 352 through a network interface or adapter 356. When used in a WAN networking environment, the computer 300 typically includes a modem 358 or other means for establishing communications over the Internet 354. The modem 358, which may be internal or external, may be connected to the system bus 306 via the I/O interface 342, or other appropriate mechanism. In a networked environment, program modules depicted relative to the computer 300, or portions thereof, may be stored in the remote computing device 350. By way of example, and not limitation, FIG. 3 illustrates remote application programs 360 as residing on remote computing device 350. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method, comprising:
 power on self test (POST) processing in the basic input/output system (BIOS) of a computing device;
 detecting a connection to a remote memory device;
 writing an access level indicator stored on the remote memory device to an output device;

receiving a verification signal from a user associated with the remote memory device; and granting an access level to a user based on at least one of the access level indicator or the verification signal.

2. The method of claim 1, wherein detecting a connection to a remote memory device comprises:

detecting an interrupt signal generated in response to the remote memory device; and initiating a handshake protocol to establish communication with the remote memory device.

3. The method of claim 2, further comprising reading the access level indicator stored on the remote memory device.

4. The method of claim 1, wherein detecting a connection to a remote memory device comprises poll system hardware to determine whether a memory device is connected to the computing device.

5. The method of claim 1, wherein reading an access level comprises decoding the access level indicator.

6. The method of claim 1, wherein writing the access level indicator stored on the remote memory device to an output device comprises presenting the access level indicator on a display screen.

7. A computer system, comprising:

a processor;

a basic input/output system (BIOS) including logic instructions which, when executed by the processor, configure the processor to:

initiate power on self test (POST) processing in the basic input/output system (BIOS) of a computing device;

detect a connection to a remote memory device;

write an access level indicator stored on the remote memory device to an output device;

receive a verification signal from a user associated with the remote memory device; and grant an access level to a user based on at least one of the access level indicator or the verification signal.

8. The computer system of claim 7, wherein the BIOS further comprises logic instructions which, when executed by the processor, configure the processor to:

detect an interrupt signal generated in response to the remote memory device; and initiate a handshake protocol to establish communication with the remote memory device.

9. The computer system of claim 7, wherein the BIOS further comprises logic instructions which, when executed by the processor, configure the processor to read an access level indicator stored on the remote memory device.

10. The computer system of claim 7, wherein the BIOS further comprises logic instructions which, when executed by the processor, configure the processor to poll system hardware to determine whether a memory device is connected to the computing device.

11. The computer system of claim 7, wherein the BIOS further comprises logic instructions which, when executed by the processor, configure the processor to decode the access level indicator.

12. The computer system of claim 7, wherein the BIOS further comprises logic instructions which, when executed by the processor, configure the processor to present the access level indicator on a display screen.

13. A computer program product comprising logic instructions stored on a computer-readable medium which, when executed by a computer processor, configure the processor to:

initiate power on self test (POST) processing in the basic input/output system (BIOS) of a computing device;

detect a connection to a remote memory device;

write an access level indicator stored on the remote memory device to an output device;

receive a verification signal from a user associated with the remote memory device; and grant an access level to a user based on at least one of the access level indicator or the verification signal.

14. The computer program product of claim 13, further comprising logic instructions which, when executed by the processor, configure the processor to:

detect an interrupt signal generated in response to the remote memory device; and initiate a handshake protocol to establish communication with the remote memory device.

15. The computer program product of claim 13, further comprising logic instructions which, when executed by the processor, configure the processor to read an access level indicator stored on the remote memory device.

16. The computer program product of claim 13, further comprising logic instructions which, when executed by the processor, configure the processor to decode the access level indicator.

17. The computer program product of claim 13, further comprising logic instructions which, when executed by the processor, configure the processor to present the access level indicator on a display screen.

18. A computer system, comprising:

a processor;

a basic input/output system (BIOS) module:

means for initiating power on self test (POST) processing in the computing device;

means for detecting a connection to a remote memory device; and means for writing an access level indicator stored on the remote memory device to an output device;

means for reading access level indicator stored on the remote memory device;

means for receiving a verification signal from a user associated with the remote memory device; and means for granting an access level to a user based on at least one of the access level indicator or the verification signal.

19. The computer system of claim 18, further comprising:

means for detecting an interrupt signal generated in response to the remote memory device; and means for initiating a handshake protocol to establish communication with the remote memory device.

* * * * *